(12) United States Patent
Sasaki

(10) Patent No.: US 9,092,862 B2
(45) Date of Patent: Jul. 28, 2015

(54) IMAGE PROCESSING APPARATUS, IMAGE ADJUSTING APPARATUS, IMAGE PROCESSING METHOD AND COMPUTER READABLE MEDIUM

(71) Applicant: FUJI XEROX CO., LTD., Minato-ku, Tokyo (JP)

(72) Inventor: Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 108 days.

(21) Appl. No.: 13/893,922

(22) Filed: May 14, 2013

(65) Prior Publication Data

US 2014/0133778 A1    May 15, 2014

(30) Foreign Application Priority Data

Nov. 14, 2012    (JP) ................ 2012-250494

(51) Int. Cl.
| | | |
|---|---|---|
| G06K 9/40 | (2006.01) | |
| G06K 9/00 | (2006.01) | |
| G09G 5/02 | (2006.01) | |
| G06T 5/00 | (2006.01) | |
| G06T 5/40 | (2006.01) | |
| G06T 5/10 | (2006.01) | |
| H04N 1/58 | (2006.01) | |
| G06T 7/00 | (2006.01) | |
| H04N 1/409 | (2006.01) | |

(52) U.S. Cl.
CPC ............... *G06T 5/003* (2013.01); *G06T 5/004* (2013.01); *G06T 5/006* (2013.01); *G06T 5/10* (2013.01); *G06T 5/40* (2013.01); *G06T 7/0081* (2013.01); *G06T 2207/10024* (2013.01); *G06T 2207/20112* (2013.01); *H04N 1/4092* (2013.01); *H04N 1/58* (2013.01)

(58) Field of Classification Search
CPC ......... G06T 5/002; G06T 5/003; G06T 5/004; G06T 5/006; G06T 5/10; G06T 5/40; G06T 2207/10024; G06T 2207/20112; G06T 7/0081; H04N 1/4092; H04N 1/58
USPC .......... 382/167–169, 173, 266, 274; 358/518, 358/520, 522, 532; 345/589, 604
See application file for complete search history.

(56) References Cited

U.S. PATENT DOCUMENTS

| | | | |
|---|---|---|---|
| 6,097,847 A | 8/2000 | Inoue | |
| 6,137,904 A * | 10/2000 | Lubin et al. | 382/162 |
| 6,392,759 B1 | 5/2002 | Kuwata et al. | |
| 6,480,300 B1 * | 11/2002 | Aoyama | 358/1.9 |
| 7,133,157 B2 * | 11/2006 | Ito | 358/1.9 |
| 8,472,713 B2 * | 6/2013 | Manabe | 382/167 |

FOREIGN PATENT DOCUMENTS

| | | |
|---|---|---|
| JP | 6-68252 A | 3/1994 |
| JP | 11-55526 A | 2/1999 |
| JP | 2006-24097 A | 1/2006 |

* cited by examiner

*Primary Examiner* — Kanjibhai Patel
(74) *Attorney, Agent, or Firm* — Sughrue Mion, PLLC

(57) ABSTRACT

An image processing apparatus includes: a decomposing section that decomposes a luminance component of a given original image into a plurality of band images in respective bands; a band intensity calculating section that calculates band intensities of the respective band images; and a determining section that determines band selection information indicating an emphasis band and band emphasis information to be used for controlling a degree of image emphasis based on the band intensities of the respective bands.

12 Claims, 13 Drawing Sheets

IMAGE PROCESSING APPARATUS, IMAGE ADJUSTING APPARATUS, IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2012-250494 filed on Nov. 14, 2012.

BACKGROUND

1. Technical Field

The present invention relates to an image processing apparatus, an image processing program, an image adjusting apparatus, and an image adjusting program.

2. Related Art

A number of image adjusting techniques are known. In one basic method, color balance correction, chroma emphasis, etc. are performed by analyzing a histogram of pixel signals. To emphasize an outline or edges of a subject in a photograph image, it is common to perform frequency emphasis processing such as unsharp masking. Frequency emphasis processing produces an effect of making an outline or edges of a subject and hence its shape clear. Frequency emphasis processing is performed while adjusting the emphasis band and intensity (gain) using Gaussian function type filtering processing, unsharp masking, or the like.

In band emphasis, the degree of emphasis (reproduction intensity) is adjusted by controlling coefficients. Since the reproduction intensity is adjusted according to an image, the image needs to be analyzes as preprocessing. In band emphasis, in general, high-frequency components (edges) are emphasized. The degrees of variation of edges are calculated from a luminance component of an image and band emphasis is performed using coefficients that are suitable for the calculated degrees, whereby a reproduction image that conforms to the original image is obtained.

Not that the emphasis of high-frequency components such as edges provides a satisfactory result for every image. The adjustment target band varies depending on a scene represented by an image; for example, it may be a low-frequency band and a medium frequency band or a high-frequency band that is close to a medium frequency band. And the reproduction intensity varies depending on the adjustment target band. It is therefore necessary to select a band that is suitable for an image and to adjust the reproduction intensity in the selected band.

SUMMARY

According to an aspect of the invention, there is provided an image processing apparatus including: a decomposing section for decomposing a luminance component of a given original image into plural band images in respective bands; a band intensity calculating section for calculating band intensities of the respective band images; and a determining section for determining band selection information indicating an emphasis band and band emphasis information to be used for controlling the degree of image emphasis on the basis of the band intensities of the respective bands.

BRIEF DESCRIPTION OF THE DRAWINGS

Exemplary embodiment of the present invention will be described in detail based on the following figures, wherein.

DESCRIPTION OF SYMBOLS

11 . . . Luminance image generating section; 12 . . . Band decomposition section; 13 . . . Band intensity calculating section; 14 . . . Reproduction information determining section; 21 . . . Band region image generating section; 22 . . . Area parameter calculating section; 31 . . . Color characteristics adjusting section; 32 . . . Color converting section; 33 . . . Band image generating section; 34 . . . Band emphasis section; 35 . . . Reverse color converting section; 36 . . . Luminance image generating section; 41 . . . Program; 42 . . . Computer; 51 . . . Magneto-optical disc; 52 . . . Optical disc; 53 . . . Magnetic disk; 54 . . . Memory; 61 . . . CPU; 62 . . . Internal memory; 63 . . . Reading unit; 64 . . . Hard disk drive; 65 . . . Interface; 66 . . . Communication unit.

DETAILED DESCRIPTION

Figure 1:
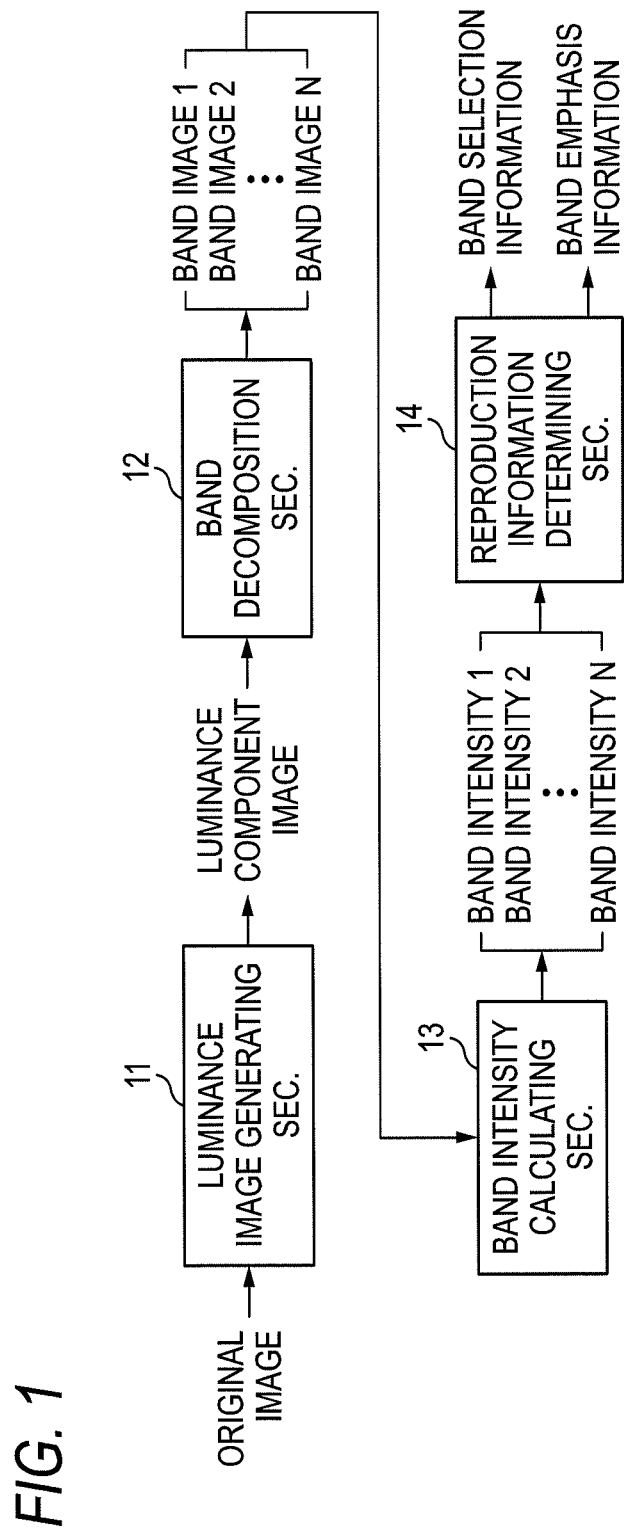
FIG. 1 shows the configuration of an image processing apparatus according to a first exemplary embodiment of the present invention.

FIG. 1 shows the configuration of an image processing apparatus according to a first exemplary embodiment of the present invention. In FIG. 1, reference numeral 11 denotes a luminance image generating section; 12, a band decomposition section; 13, a band intensity calculating section, and 14, a reproduction information determining section. The luminance image generating section 11 extracts a luminance component from a given original image. If the given original image is an image that is in such a color space as not to have a luminance component, the luminance image generating section 11 generates a luminance component image by converting the original image into an image that is in such a color space as to have a luminance component. If the given original image is an image that is in such a color space as to have a luminance component, the luminance image generating section 11 can extract a luminance component from the original image itself. If the given original image is a monochrome image, the monochrome image itself is employed as a luminance component image. In this case, the luminance image generating section 11 may be omitted.

The band decomposition section 12 generates plural band images by decomposing the luminance component of the original image into images in plural bands. The plural bands are set so as to range from a low-frequency band to a high-frequency band and to include at least one low-frequency-side band not including the zero frequency. The plural bands may either be continuous or be separated from each other. There may exist bands that overlap with each other.

The band intensity calculating section 13 calculates band intensities of the respective band images. For example, a band intensity of each band image is calculated on the basis of an integration value of its pixel values.

The reproduction information determining section 14 determines, on the basis of the band intensities of the respective bands, band selection information which indicates an emphasis band(s) and band emphasis information to be used for controlling the degree of emphasis of the image. For example, the reproduction information determining section 14 determines band selection information and band emphasis information on the basis of differences between the band intensities of the respective bands and (pre)set band reference values. Alternatively, the reproduction information determining section 14 determines band selection information on the basis of differences between the band intensities of the respective bands and (pre)set band reference values and determines band emphasis information according to a difference between the band intensity and the band reference value of the band indicated by the band selection information.

Figure 2:
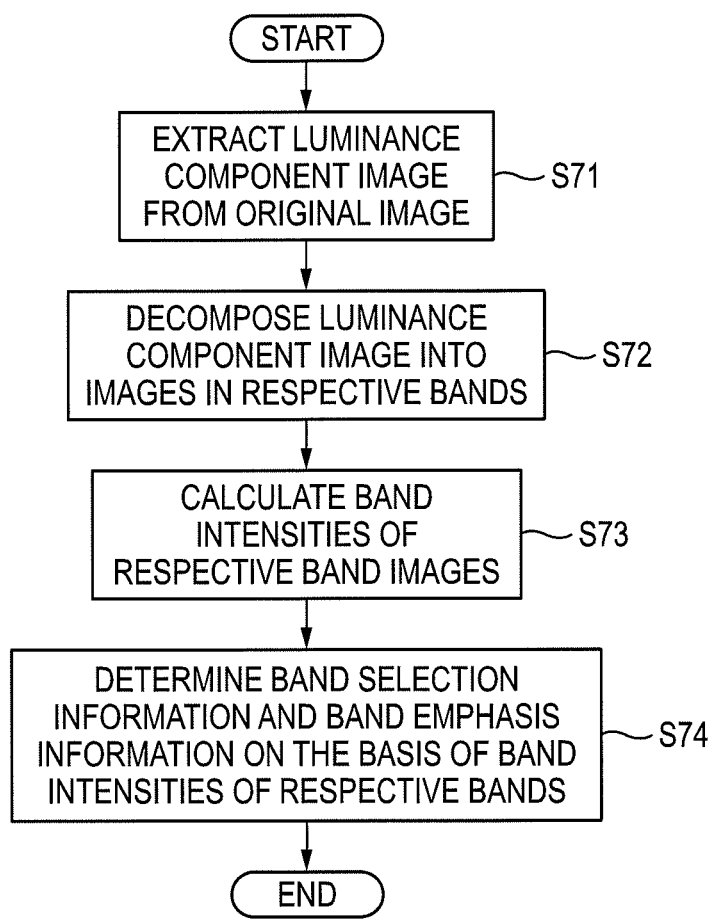
FIG. 2 is a flowchart showing an example operation of the information processing apparatus according to the first exemplary embodiment of the invention.

An example operation of the information processing apparatus having the above configuration will be described below using specific examples. FIG. 2 is a flowchart showing an example operation of the information processing apparatus according to the first exemplary embodiment of the invention. At step S71, the luminance image generating section 11 extracts a luminance component from a given original image. A natural image such as a photograph may be an image in the RGB color space or the sRGB color image. If the given original image is an image in the sRGB color image, the luminance image generating section 11 converts the original image into an image that is in such a color space as to have a luminance component (e.g., sRGB→sYCbCr or sRGB→L*a*b*). In the case of conversion into the sYCbCr color space, a Y component is employed as a luminance component. In the case of conversion into the CIELAB color space, an L* component is employed as a luminance component. If the given original image is an image that is in such a color space as to have a luminance component (e.g., sYCbCr color space or CIELAB color space), the luminance image generating section 11 extracts a luminance component from the original image itself.

Figure 3:
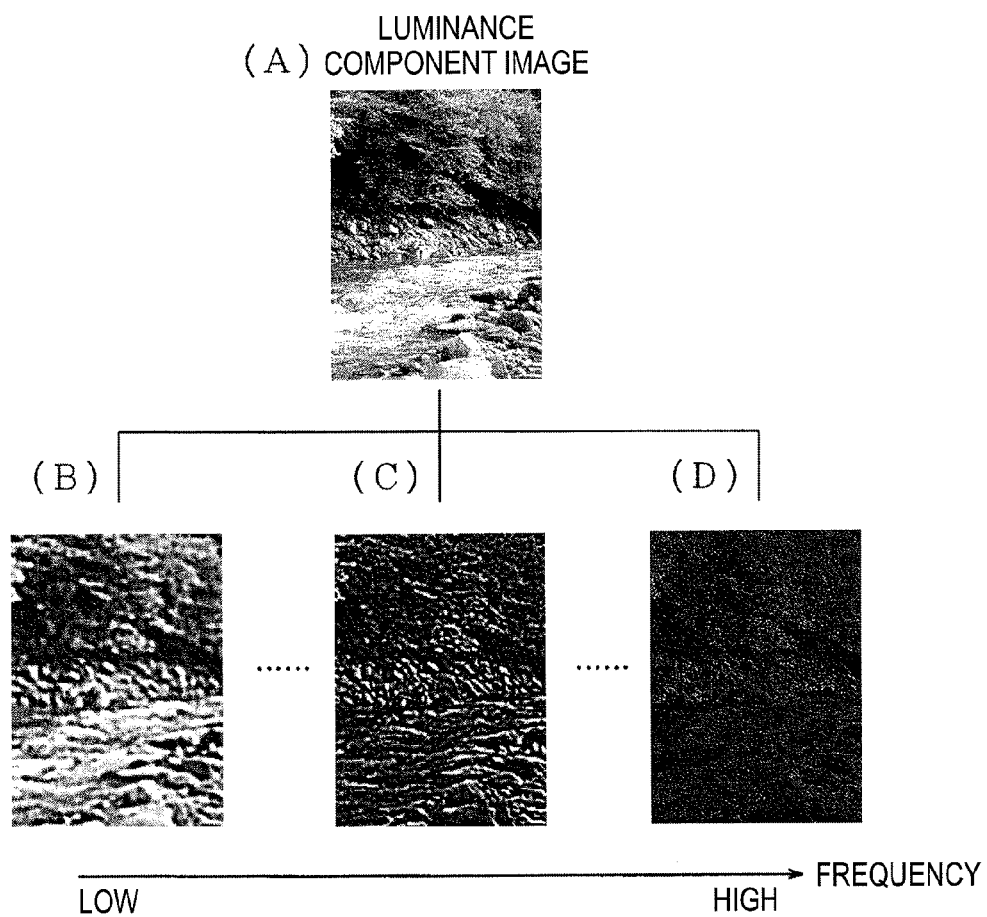
FIG. 3 shows example band images.

At step S72, the band decomposition section 12 generates plural band images by decomposing the luminance component image obtained by the luminance image generating section 11 into images in respective bands. FIG. 3 shows example band images. Part (A) of FIG. 3 shows a luminance component image of an original image, and parts (B)-(D) of FIG. 3 show frequency component images in respective frequency bands obtained by decomposing the luminance component image of part (A) of FIG. 3. A known method such as a wavelet analysis or a method using a DOG (difference of two Gaussians) function may be used for decomposing a luminance component image into band images in respective frequency bands.

Figure 4:
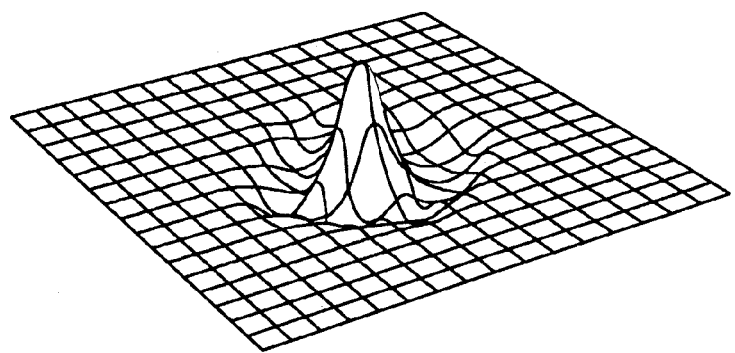
FIG. 4 illustrates an example DOG function.

FIG. 4 illustrates an example DOG function. The DOG function is given by the following Equation (1):

$$G_{DOG}(x,y) = (1/2\pi\sigma_e^2)e^{t_e} - A \cdot (1/2\pi\sigma_i^2)e^{t_i} \qquad (1)$$

where $$t_e = -(x^2+y^2)/2\sigma_e^2$$

$$t_i = -(x^2+y^2)/2\sigma_i^2.$$

In Equation (1), $\sigma_e$, $\sigma_i$, and A are control coefficients.

The DOG function is known as a function for description of a mathematical model of a vision characteristic in the human brain. FIG. 4 shows the shape of an example DOG function. The frequency band, the strength reaction to the frequency band, etc. are controlled by changing the control coefficients. By filtering a luminance component image using a filter designed according to Equation (1) with the control coefficients adjusted, a band image corresponding to the thus-set coefficients is obtained. Plural band images are generated by changing the control coefficients. The filtering may be performed in either the real space or the frequency space. In the latter case, Equation (1) may be Fourier-transformed.

Figure 5:
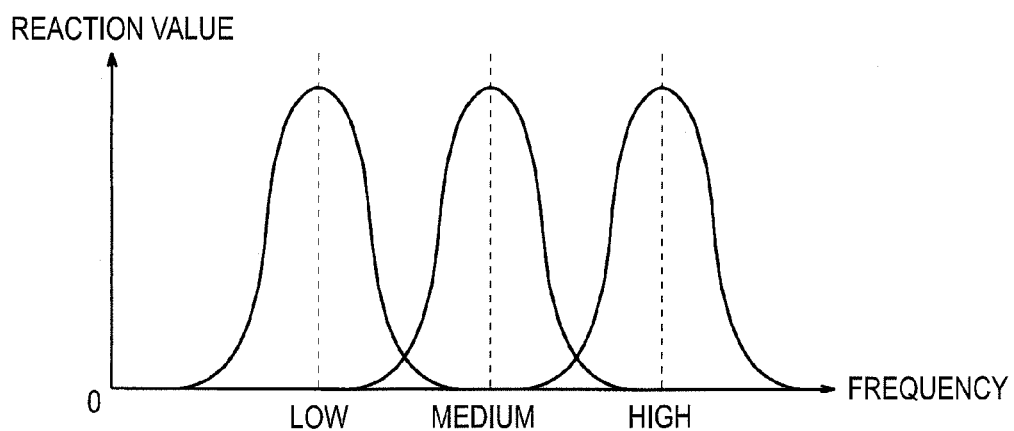
FIG. 5 illustrates an example relationship between the characteristic and the control coefficients of the DOG function.

FIG. 5 illustrates an example relationship between the characteristic and the control coefficients of the DOG function, that is, how the frequency band varies as the control coefficients $\sigma_e$, $\sigma_i$, and A are controlled. The vertical axis represents the reaction value indicating the strength of reaction of a luminance component image to the filtering. The reaction to the frequency band becomes stronger as the reaction value increases. As shown in FIG. 5, band images in respective frequency bands are obtained by performing filtering while changing the frequency band by controlling the control coefficients of Equation (1).

Figure 6A:
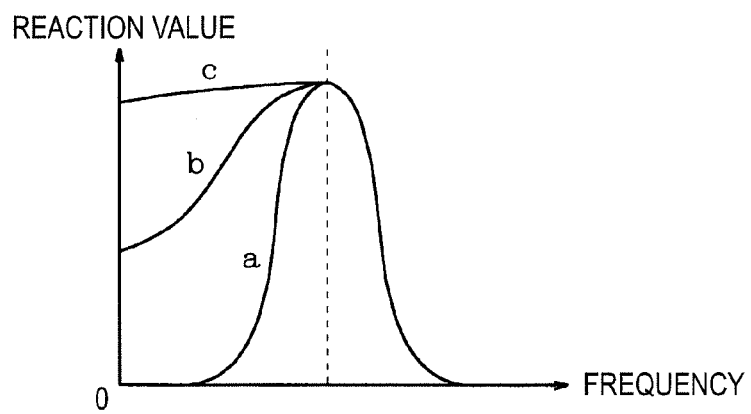
FIGS. 6A, 6B and 6C show examples of low-frequency bands and corresponding band images.
Figure 6B:
Figure 6C:

FIGS. 6A-6C show examples of low-frequency bands and corresponding band images. As shown in FIG. 5, plural bands are set so as to range from a low-frequency band to a high-frequency band and band images in the respective bands are generated. At least one low-frequency-side band not including the zero frequency is set. The term "low-frequency image" sometimes means an image obtained by blurring an original image. In this example of decomposition into a band image, a low-frequency-side band not including the zero frequency is set and a band image is obtained in that band.

In the case of a luminance component image, a value at the zero frequency represents an average luminance value. A blurred image retains an average luminance value as it is and includes the zero frequency. In FIG. 6A, characters b and c indicate such frequency bands, that is, frequency bands including the zero frequency. FIG. 6B shows a corresponding example image.

The frequency band that is indicated by character a in FIG. 6A does not include the zero frequency, and FIG. 6C shows a corresponding example image. In this manner, the band decomposition section 12 sets a low-frequency-side band not including the zero frequency and generates band image in this band. In the band image of FIG. 6C which is in the low-frequency-side band not including the zero frequency, shapes (thick outlines) of subjects rather than their edges are detected. In contrast, in the band image of FIG. 6B which is in the low-frequency-side band including the zero frequency is different from the band image of FIG. 6C in that outline components are lost and luminance values are close to an average luminance value. An image in a band including the zero frequency can also be obtained by adjusting the control coefficients of Equation (1).

Different features are obtained by different frequency bands which include a low-frequency band not including the zero frequency. More specifically, edges are obtained by a high-frequency band, shapes are obtained by a medium-frequency band, and rough shapes are obtained by a low-frequency band not including the zero frequency. A blurred image is obtained by a low-frequency band including the zero frequency. In what band an original image should be emphasized to improve the texture by band emphasis depends on the nature of the original image. Therefore, the band decomposition section 12 sets plural bands each not including the zero frequency and uses them in analyzing the nature of the original image. Naturally, the band decomposition section 12 may set plural bands which include a band including the zero frequency and uses them in analyzing the nature of the original image.

It goes without saying that the method by which the band decomposition section 12 performs decomposition into band images is not limited to the method using Equation (1). For example, band restriction may be done by blurring a luminance component image by wavelet transform or image reduction/enlargement or using a Gaussian function and taking a difference between images before and after the blurring. A band image in a medium or low-frequency band can be obtained by blurring the thus-blurred image and taking a difference between images before and after the latter blurring.

Figure 7:
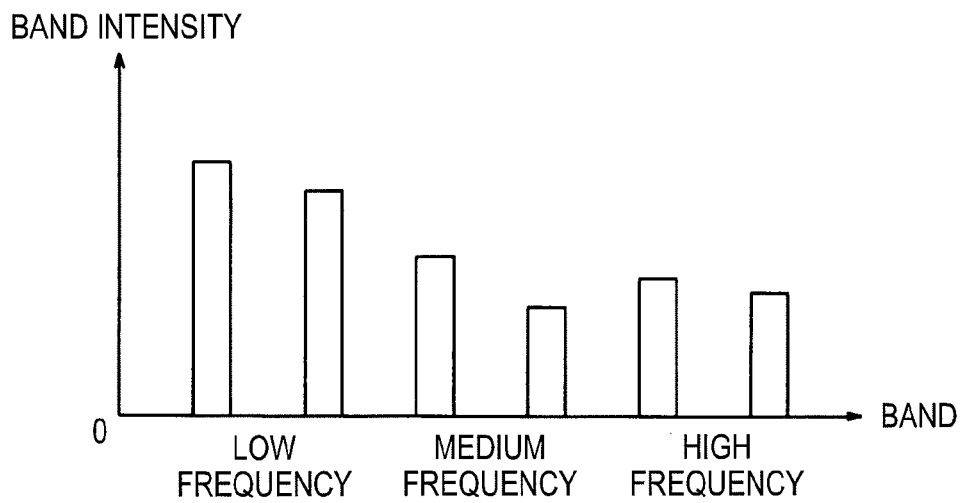
FIG. 7 shows example band intensities.

Returning to FIG. 2, at step S73, the band intensity calculating section 13 calculates band intensities of the respective band images. FIG. 7 shows example band intensities. For example, a band intensity of each band image is calculated on the basis of an integration value of its pixel values. Each band intensity thus obtained indicates to what extent the component of the band is included in the luminance component image. An integration value may be normalized on the basis of the image size. In the example of FIG. 7 is a result obtained by calculating band intensities from band images obtained in six bands and arranging them in order of their frequencies.

The band intensity is not limited to an integration value of pixel values of a band image, and may be any kind of value indicating to what extent the component of the band is included in the luminance component image.

Figure 8:
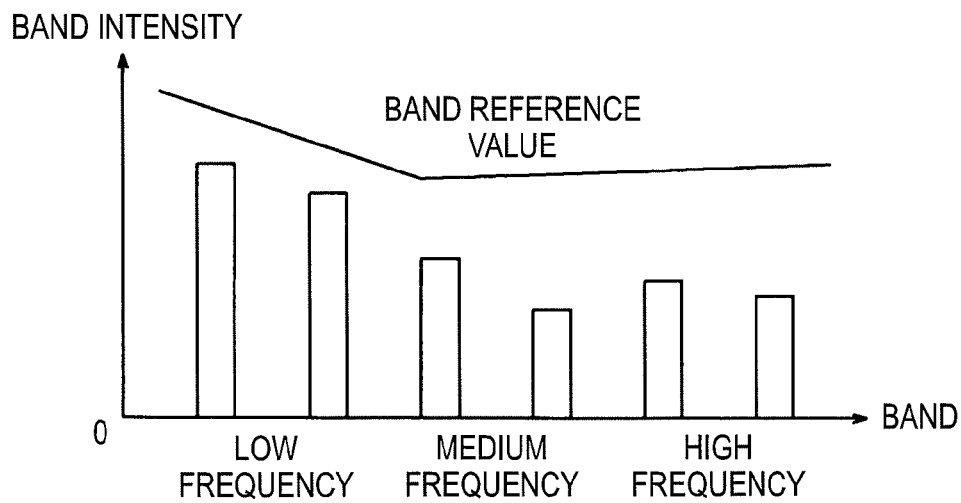
FIG. 8 illustrates an example method for determining band selection information and band emphasis information.

At step S74 shown in FIG. 2, the reproduction information determining section 14 determines, on the basis of the band intensities of the respective bands, band selection information which indicates an emphasis band(s) and band emphasis information to be used for controlling the degree of emphasis of the image. FIG. 8 illustrates an example method for determining band selection information and band emphasis information. In this example, the reproduction information determining section 14 determines band selection information and band emphasis information on the basis of differences between the band intensities of the respective bands and band reference values.

The band reference values are values indicating band intensity targets of the respective bands. The band intensity targets may be set according to how band emphasis is performed. For example, band reference values may be set in advance according to a kind of a band emphasis target, that is, according to which of a still object, a food material, or the like, glasswork, hair, feathers, or the like, or a metallic object such as a spoon or a can the subject is. One of several sets of band reference values prepared in advance may be selected according to an image concerned. For example, a set of band reference values corresponding to one, corresponding to an image concerned, of several kinds of targets of band emphasis may be selected. Alternatively, a set of band reference values may be selected may be selected according to a tendency of band intensities of the respective bands. As a further alternative, band reference values may be set according to a received instruction for adjustment of band reference values.

The band reference values used in the example of FIG. 8 are such that emphasis is made on the high-frequency side. On the other hand, band intensities in a medium to high-frequency range are insufficient relative to the corresponding band reference values. Therefore, a satisfactory result would be obtained by selecting medium to high-frequency bands and performing band emphasis so that their band intensities become closer to the corresponding band reference values.

Band emphasis may be performed according to the following equation:

$$Ye = \alpha \cdot Yb + Yo$$

where Yo is the pixel value of a luminance component of an original image, Yb is the pixel value of a band image in a certain band, Ye is the pixel value of an emphasized image, and $\alpha$ is an emphasis coefficient. In the example of FIG. 8, the emphasis coefficient $\alpha$ is determined using the band image in each medium or high-frequency band. In doing so, information indicating each medium or high-frequency band is band selection information and the emphasis coefficient $\alpha$ is band emphasis information to be used for making its band intensity closer to the corresponding band reference value. The band selection information may be any information as long as it indicates a selected band, and may be, for example, the control coefficients $\sigma_e$ and $\sigma_i$ in Equation (1) that was used in generating the band images. Since the method for decomposition into band images is not limited to the method using Equation (1), coefficients that properly indicate the method are used as band selection information. The band selection information may be any of other kinds of information such as a predetermined band number, a frequency itself, and one of options that are merely "low," "medium," "high," etc. The band emphasis information may be information that properly indicates a used emphasis processing method and indicates the degree of emphasis.

As described above, once a relationship between band reference values and band intensities is known, to what degree emphasis should be made in what band is determined and an emphasis band and the degree of emphasis are determined as band selection information and band emphasis information, respectively.

Figure 9A:
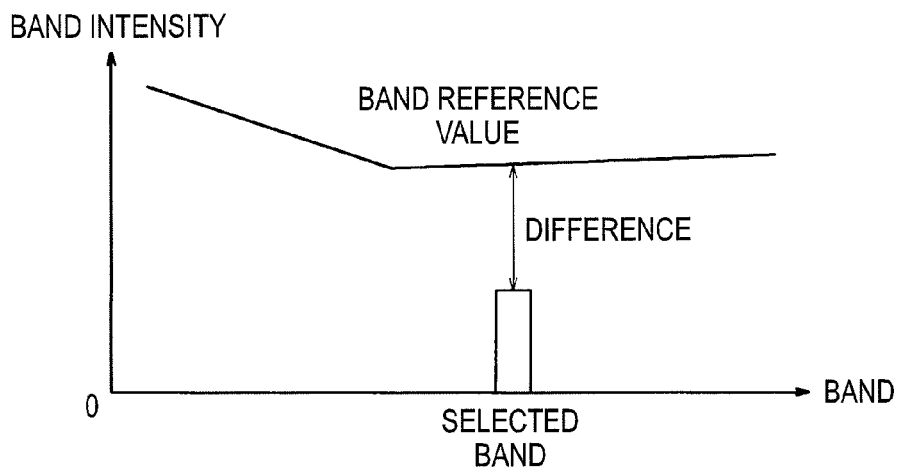
FIGS. 9A and 9B illustrate another example method for determining band selection information and band emphasis information.
Figure 9B:
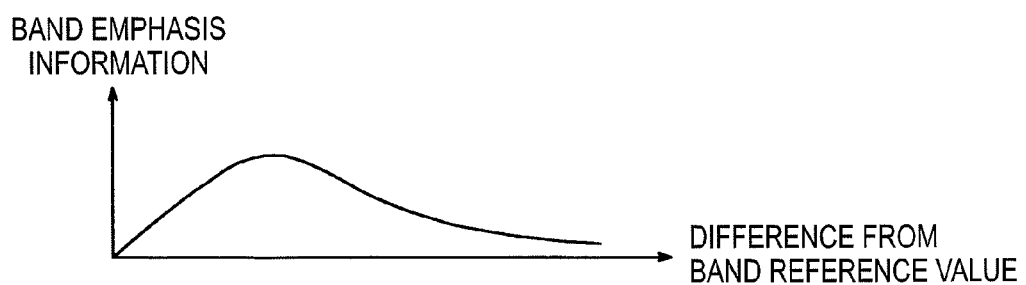

FIGS. 9A and 9B illustrate another example method for determining band selection information and band emphasis information. In this example, a band is selected on the basis of differences between the band intensities and band reference values and the degree of band emphasis is determined according to a difference between the band intensity and the band reference value of the selected band. Assume that the relationship between the band intensities and band reference values is the one shown in FIG. 8. For example, a band with which the difference between the band intensity and the band reference value is largest is selected and information indicating the selected band employed as band selection information. The degree of emphasis that is determined according to the difference (maximum value) between the band intensity and the band reference value of the selected band is employed as band emphasis information.

Basically, band emphasis information is determined so that the band intensity of the selected band becomes closer to its band reference value. However, excessive emphasis may cause an adverse effect. For example, such a phenomenon may be prevented by determining band emphasis information according to a relationship shown in FIG. 9B. If the difference between the band intensity of the selected band and its band reference value is smaller than or equal to a certain value, the difference is employed as the degree of emphasis to be used for making the band intensity close to the band reference value. On the other hand, if the difference between the band intensity of the selected band and its band reference value is larger than the certain value, the degree of emphasis is lowered as the difference increases. In this manner, if the difference between the band intensity of the selected band and its band reference value is larger than the certain value, band emphasis information is determined so that the band intensity is not made too closer to the band reference value and a proper degree of emphasis is thereby made.

Figure 10:
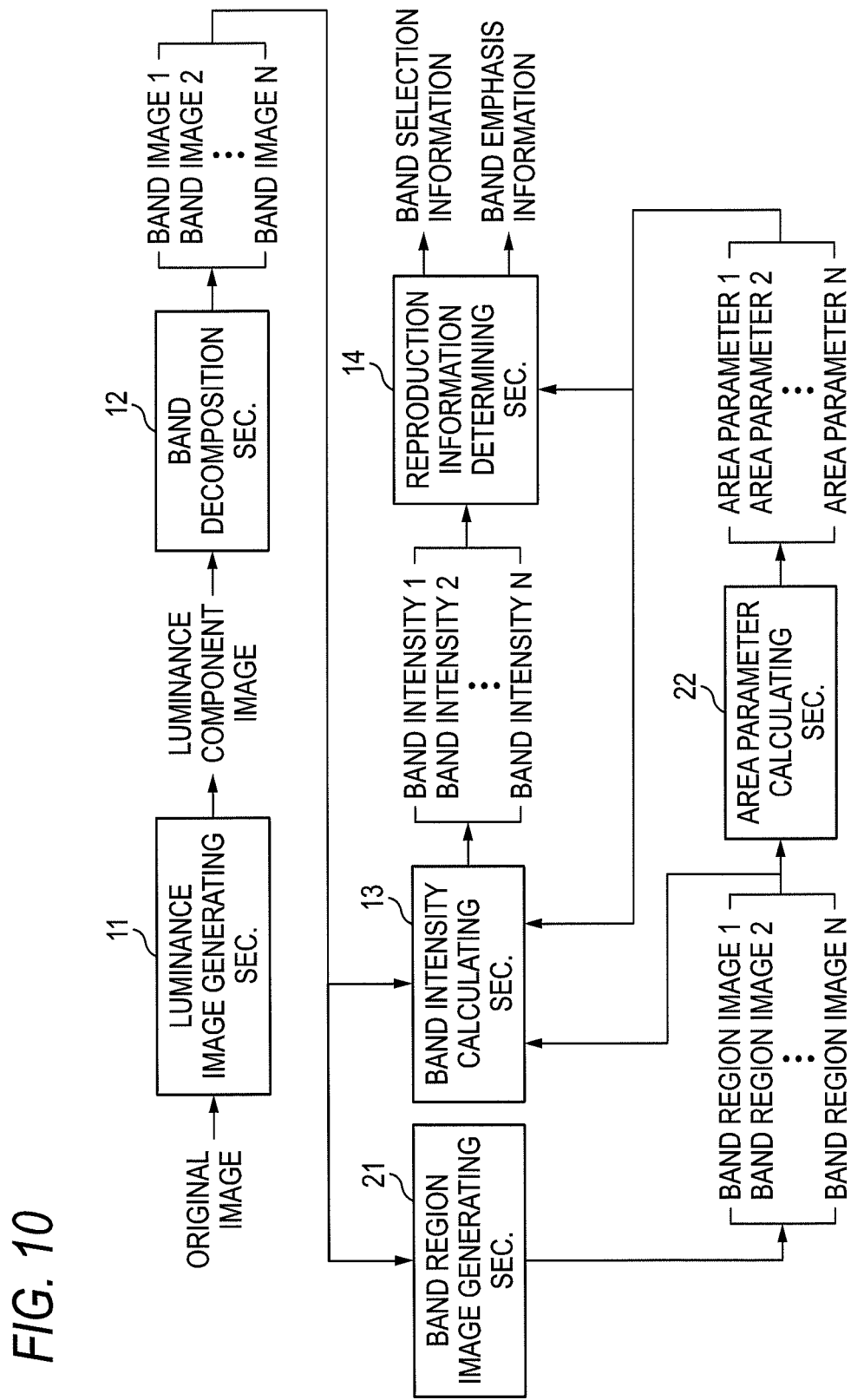
FIG. 10 shows the configuration of an information processing apparatus according to a second exemplary embodiment of the invention.

FIG. 10 shows the configuration of an information processing apparatus according to a second exemplary embodiment of the invention. In FIG. 10, reference numeral 21 denotes a band region image generating section and reference numeral 22 denotes an area parameter calculating section. Differences from the first exemplary embodiment will mainly be described below.

The band region image generating section 21 generates, for each of band images generated by the band decomposition section 12, a band region image indicating large-pixel-value regions in it. An example method for generating a band region image is to binarize each band image. Naturally, any other method may be employed for this purpose.

The area parameter calculating section 22 calculates, on the basis of the band region image, generated by the band region image generating section 21, of each band image, an area parameter which represents the total area of the large-pixel-value regions. For example, the area parameter calculating section 22 calculates the total number of pixels included in the large-pixel-value regions.

The band intensity calculating section 13 may calculate band intensities on the basis of the band images generated by the band decomposition section 12 and the band region images generated by the band region image generating section 21. For example, the band intensity calculating section 13 calculates a band intensity of each band image by integrating pixel values of the pixels included in the large-pixel-value regions of its band region image.

The band intensity calculating section 13 may normalize the band intensity of each band image using the area parameter calculated by the area parameter calculating section 22. There is a tendency that the area parameter is larger in high-frequency bands than in low-frequency bands. The normalization of band intensities makes it possible to obtain band intensities that are free of such a tendency.

The reproduction information determining section 14 may determine band selection information which indicates an emphasis band(s) and band emphasis information to be used for controlling the degree of emphasis of the image on the basis of the band intensities of the respective bands and the area parameters calculated by the area parameter calculating section 22. Where the area parameters are used, the reproduction information determining section 14 determines band selection information and band emphasis information on the basis of the area parameters of the respective band images or on the basis of differences between the band intensities of the respective bands and (pre)set band reference values and the area parameters of the respective band images. Alternatively, the reproduction information determining section 14 determines band selection information on the basis of the area parameters of the respective band images or on the basis of differences between the band intensities of the respective bands and (pre)set band reference values and the area parameters of the respective band images, and determines band emphasis information according to a difference between the band intensity and the band reference value of the band indicated by the band selection information.

Figure 11:
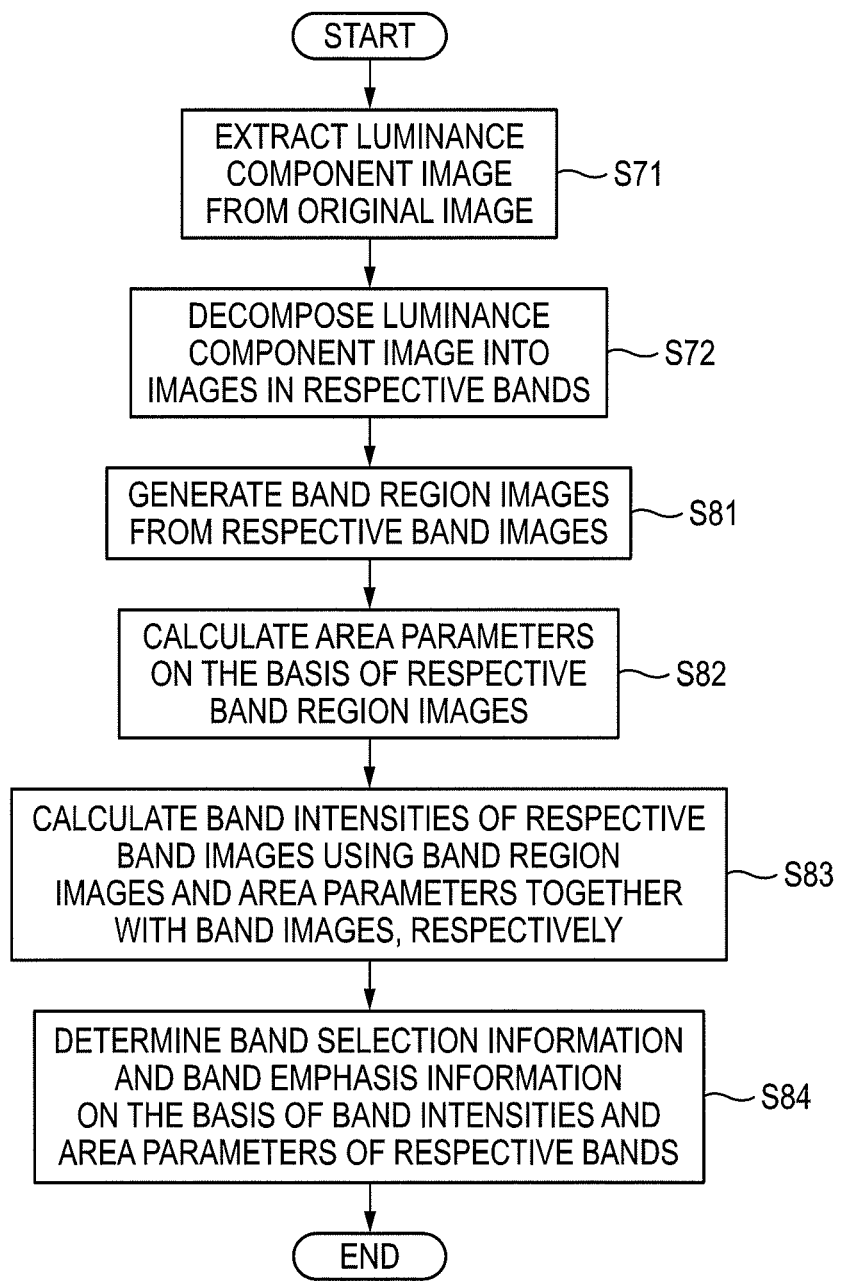
FIG. 11 is a flowchart showing an example operation of the information processing apparatus according to the second exemplary embodiment of the invention.

An example operation of the information processing apparatus having the above configuration will be described below using specific examples. FIG. 11 is a flowchart showing an example operation of the information processing apparatus according to the second exemplary embodiment of the invention. Differences from the example operation described in the first exemplary embodiment with reference to FIG. 2 will mainly be described below. Steps S71 and S72 are the same as in the first exemplary embodiment. At step S71, the luminance image generating section 11 extracts a luminance component from a given original image. At step S72, the band decomposition section 12 generates plural band images by decomposing the luminance component image obtained by the luminance image generating section 11 into images in respective bands.

Figure 12A:
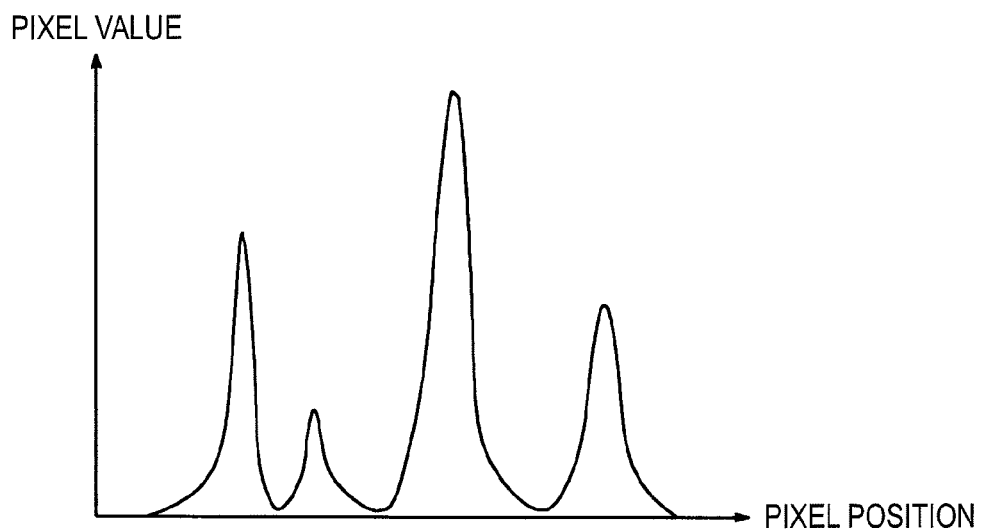
FIGS. 12A and 12B illustrate example processing for generating a band region image.
Figure 12B:
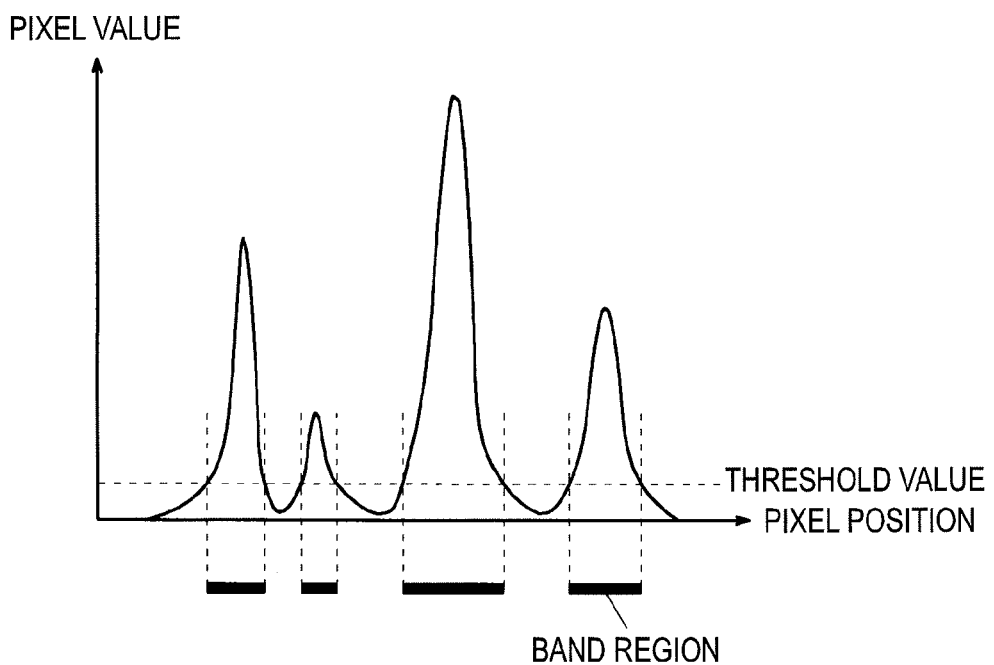

At step S81, the band region image generating section 21 generates a band region image indicating large-pixel-value regions of each of the band images generated by the band decomposition section 12. FIGS. 12A and 12B illustrate example processing for generating a band region image. In FIGS. 12A and 12B, the horizontal axis represents the pixel position of a band image in a certain frequency band and the vertical axis represents its pixel value. For example, the pixel value of the pixel of a band image generated by the band decomposition section 12 varies in the manner shown in FIG. 12A. At a position where the pixel value of this band image is smaller than other pixels, pixel values of the other band images are larger than this pixel value. For example, in a region where a picture is drawn by lines that are larger in thickness than a certain line width, pixel values of a band image obtained by extracting high-frequency components are smaller than pixel values in a region where a picture is drawn by lines that are smaller in thickness than the certain line width. Pixel values that are smaller than of other pixels, though being small, have certain influence when the band intensity calculating section 13 integrates pixel values of a band image if those small pixel values are distributed over the entire band image.

As shown in FIG. 12B, the band region image generating section 21 generates a band region image by presetting a threshold value and including pixels whose pixel values are larger than or equal to the threshold value in band regions and not including pixels whose pixel values are smaller than the threshold value in any band region. The processing corresponds to binarization processing using a threshold value. In FIG. 12B, regions indicated by thick lines are pixel regions that are employed as band regions. A band region image is generated assigning the two values to the regions indicated by the thick lines and the other regions, respectively. A threshold value may be set in advance for each band, and different threshold values may be set for the respective bands.

At step S82, the area parameter calculating section 22 calculates, on the basis of the band region image, generated by the band region image generating section 21 at step S81, of each band image, an area parameter which represents the total area of the large-pixel-value regions. For example, the area parameter calculating section 22 calculates the total number of pixels included in the regions that are indicated by the thick lines in FIG. 12B. Each calculated area parameter indicates how many pixels whose pixel values are larger than or equal to the threshold value exist in pictures in the corresponding band image.

At step S83, the band intensity calculating section 13 calculates a band intensity of each band image in approximately the same manner as at step S73 shown in FIG. 2. The band intensity calculating section 13 calculates, as a band intensity, an integration value of pixel values of the pixels that are located in the band regions of the band region image of each band image. For example, the band intensity calculating section 13 integrates the pixel values of the pixels in the regions that are indicated by the thick lines in FIG. 12B.

In a pixel image, a larger pixel value of a pixel indicates that a component of the corresponding frequency band exists there in a larger amount. Even pixel values that are smaller (i.e., than other pixel values (i.e., components of the corresponding frequency band exist in smaller amounts) may contribute to produce a large band intensity which is an integration value if they are distributed in a wide area. In this example, a band intensity is calculated by integrating pixel values of a band image in such a manner that pixels whose components of the corresponding frequency band are excluded.

Figure 13:
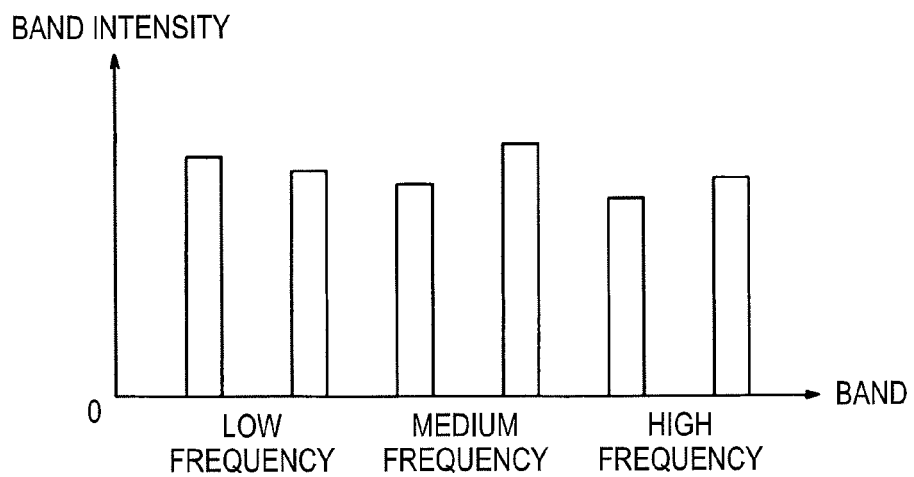
FIG. 13 shows example normalized band intensities.

The band intensity calculating section 13 may normalize the calculated band intensity by the area parameter that was calculated at step S82 by the area parameter calculating section 22. The normalization makes it possible to produce an average band intensity of each frequency band irrespective of the total area of large-pixel-value regions. Where the normalization by an area parameter is not performed, a band intensity indicates to what extent components of the corresponding band are included in the entire image. FIG. 13 shows example normalized band intensities which are normalized versions of the example band intensities shown in FIG. 7 (first exemplary embodiment).

At step S84, the reproduction information determining section 14 determines, on the basis of the band intensities of the respective bands, band selection information which indicates an emphasis band(s) and band emphasis information to be used for controlling the degree of emphasis of the image, in approximately the same manner as at step S74 shown in FIG. 2. Band reference values are set according to normalized band intensities. And the band reference values may be modified taking into consideration the area parameters that were calculated at step S82 by the area parameter calculating section 22. For example, the band reference values are modified according to the area parameters and band selection information and band emphasis information are determined according to differences between the modified band reference values and the band intensities.

Figure 14:
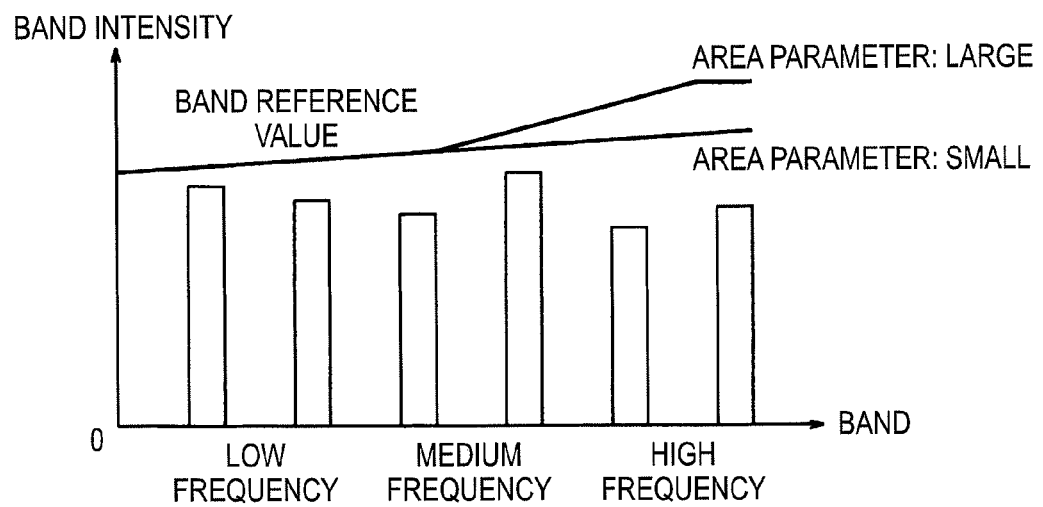
FIG. 14 illustrates an example manner band reference values are set using area parameters.

FIG. 14 illustrates how band reference values are set using area parameters. In this example, band reference values are modified according to area parameters of high-frequency bands. More specifically, band reference values in a high-frequency range are increased as area parameters of high-frequency bands increase. When area parameters of high-frequency bands are larger, which indicate that more pixels whose pixel values are in high-frequency bands are included in the original image, image components in the high-frequency bands are emphasized to larger extents. For example, one of several band reference values (options) may be selected by comparing an area parameter with a predetermined value. It goes without saying that area parameters used are not limited to ones of high-frequency bands. Band reference values to be set are not limited to the ones as shown in FIG. 14, and band reference parameters of any kind may be used as long as they are set taking area parameters into consideration.

Band selection information and band emphasis information are determined in approximately the same manner as at step S74 shown in FIG. 2 (first exemplary embodiment) using the thus-determined band reference values.

Figure 15:
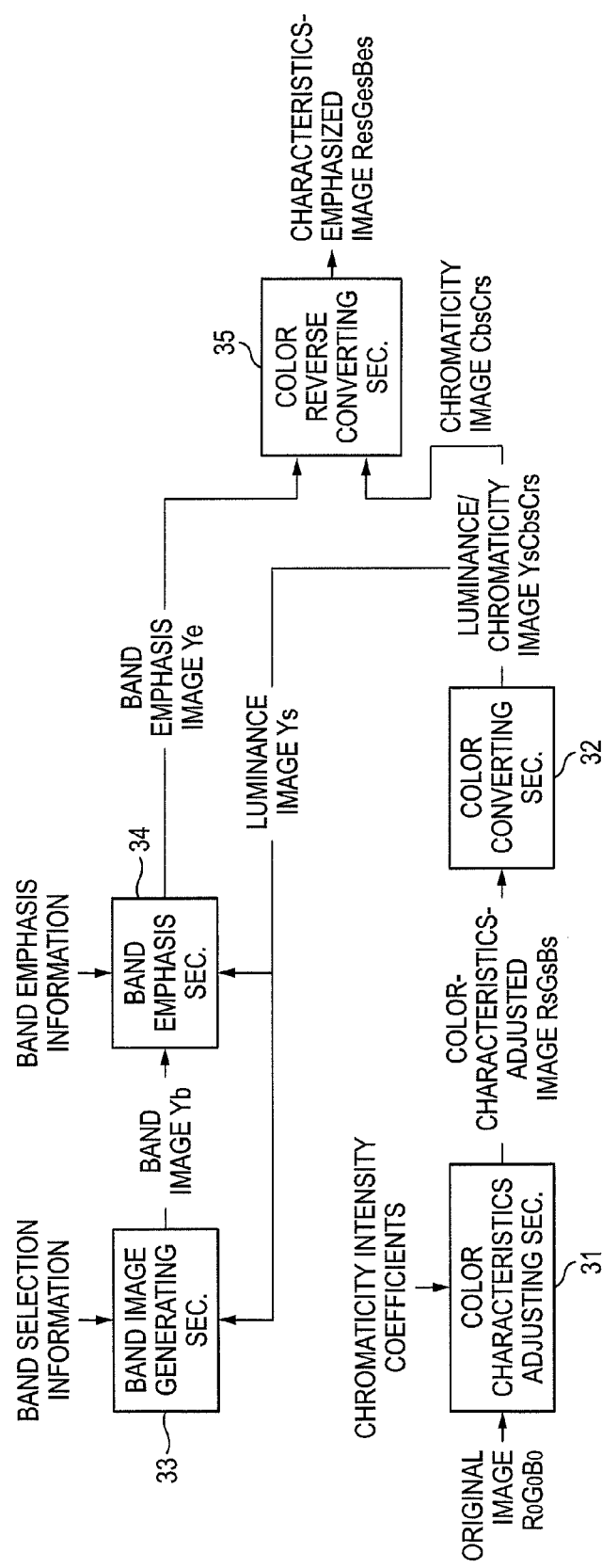
FIG. 15 shows the configuration of an image adjusting apparatus according to a third exemplary embodiment of the invention.

FIG. 15 shows the configuration of an image adjusting apparatus according to a third exemplary embodiment of the invention. In FIG. 15, reference numeral 31 denotes a color characteristics adjusting section; 32, a color converting section; 33, a band image generating section; and 34, a band emphasis section; 35, a color reverse converting section. This is an example image adjusting apparatus which adjusts an image using band selection information and band emphasis information that have been determined by the image processing apparatus according to the first or second exemplary embodiment. In this example, a given original image and a processed, characteristics-emphasized image are color images in the RGB color space. However, the invention is not limited to such a case; an original image and a characteristics-emphasized image may be images in another color space or in difference color spaces. Although in this exemplary embodiment the YCbCr color space is employed as a luminance/chromaticity color space that is used temporarily, any color space may be employed as long as it has luminance as one axis, such as the CIELAB color space in which luminance is represented by L* and chromaticity is represented by a*b* or the HSV color space.

The color characteristics adjusting section 31 adjusts the color characteristics of a given original color image according to preset chromaticity intensity coefficients. In this example, this is done using color signals in the color space of the original image (RGB color signals). This may be done by any of various methods. Where no color characteristics adjustment is made, the color characteristics adjusting section 31 can be omitted.

The color converting section 32 performs color space conversion processing of converting a color-characteristics-adjusted image which is a color image produced by the color characteristics adjustment by the color characteristics adjusting section 31 into a luminance/chromaticity image. This color space conversion processing has both of a function of generating a luminance image to be used by the band image generating section 33 (described later) and a function of matching the color space of a band emphasis image generated by the band emphasis section 34 (described later) with that of the color-characteristics-adjusted image produced by the color characteristics adjustment by the color characteristics adjusting section 31. Since the pixel value RsGsBs of the color-characteristics-adjusted image produced by the chromaticity intensity adjustment by the color characteristics adjusting section 31 has no luminance component as one signal element, the color converting section 32 converts its color space into a color space having a luminance component (in this example, YCbCr space) and employs a Y component image as a luminance image. The color space of resulting color signals is the same as that in which a luminance signal Ye of a band emphasis image to be produced by emphasis processing of the band emphasis section 34 (described later) is expressed. The conversion destination color space having a luminance component may be another color space such as the CIELAB color space or the HSV color space. A luminance image is obtained using an L* component in the case of the CIELAB color space and a V component in the case of the HSV color space. A luminance image generated by the color converting section 32 may be used as a luminance component image to be used by the band decomposition section 12 of the image processing apparatus according to the first or second exemplary embodiment.

The band image generating section 33 receives, as a luminance image, a Y component (luminance component) image of the luminance/chromaticity image YsCbsCrs produced by the color converting section 32, and generates, on the basis of the received luminance image, a band image in a band that is indicated by band selection information that has been determined by the image processing apparatus according to the first or second exemplary embodiment. When a new band image is to be generated, filtering processing using a DOG filter or the like (described in the first exemplary embodiment) may be used. Naturally, any of various known methods such as a method using FFT (fast Fourier transform), a method using a two-dimensional Gaussian filter, and a method using image reduction/enlargement may be used. For example, the two-dimensional Gaussian filter is expressed by the following equation:

$$G(x, y) = (1/2\pi\sigma^2)e^{-\frac{x^2+y^2}{2\sigma^2}}$$

In this equation, σ is a coefficient for controlling the band. The generated band shifts to the low-frequency side as σ increases.

The band emphasis section 34 generates a band emphasis image using the luminance image and the band image according to band emphasis information that has been determined by the image processing section according to the first or second exemplary embodiment and indicates the degree of band emphasis. Since the band image has been generated by the band image generating section 33 according to the band selection information, emphasis is made in the selected band. The emphasis processing method is not limited to a particular method and may be any of various known methods.

The reverse color converting section 35 combines the band emphasis image generated by the band emphasis section 34 with a chromaticity component image of the luminance/chromaticity image produced by the color converting section 32, and then performs reverse conversion into an image in the RGB color space. In other words, the reverse color converting section 35 replaces luminance component values of the luminance/chromaticity image produced by the color converting section 32 with pixel values of the band emphasis image (luminance component image). Whereas the color converting section 32 converts the color space to the luminance/chromaticity color space, neither the band image generating section 33 nor the band emphasis section 34 performs color space conversion. Therefore, band emphasis image generated by the band emphasis section 34 and the luminance component of the luminance/chromaticity image produced by the color converting section 32 are the same in the color space component, which enables the above replacement of the luminance component values. Where a luminance/chromaticity image is to be obtained as a characteristics-emphasized image, reverse color converting section 35 combines the band emphasis image with a chromaticity component image of the luminance/chromaticity image, and then does not perform reverse conversion into an image in the RGB color space.

The band selection information and the band emphasis information that have been obtained by the image processing apparatus according to the first or second exemplary embodiment are passed to band image generating section 33 and the band emphasis section 34, respectively. The band selection information and the band emphasis information are determined by the image processing apparatus according to the first or second exemplary embodiment on the basis of the original image, and an output characteristics-emphasized image is obtained as a result of execution of emphasis processing that is suitable for the original image.

Figure 16:
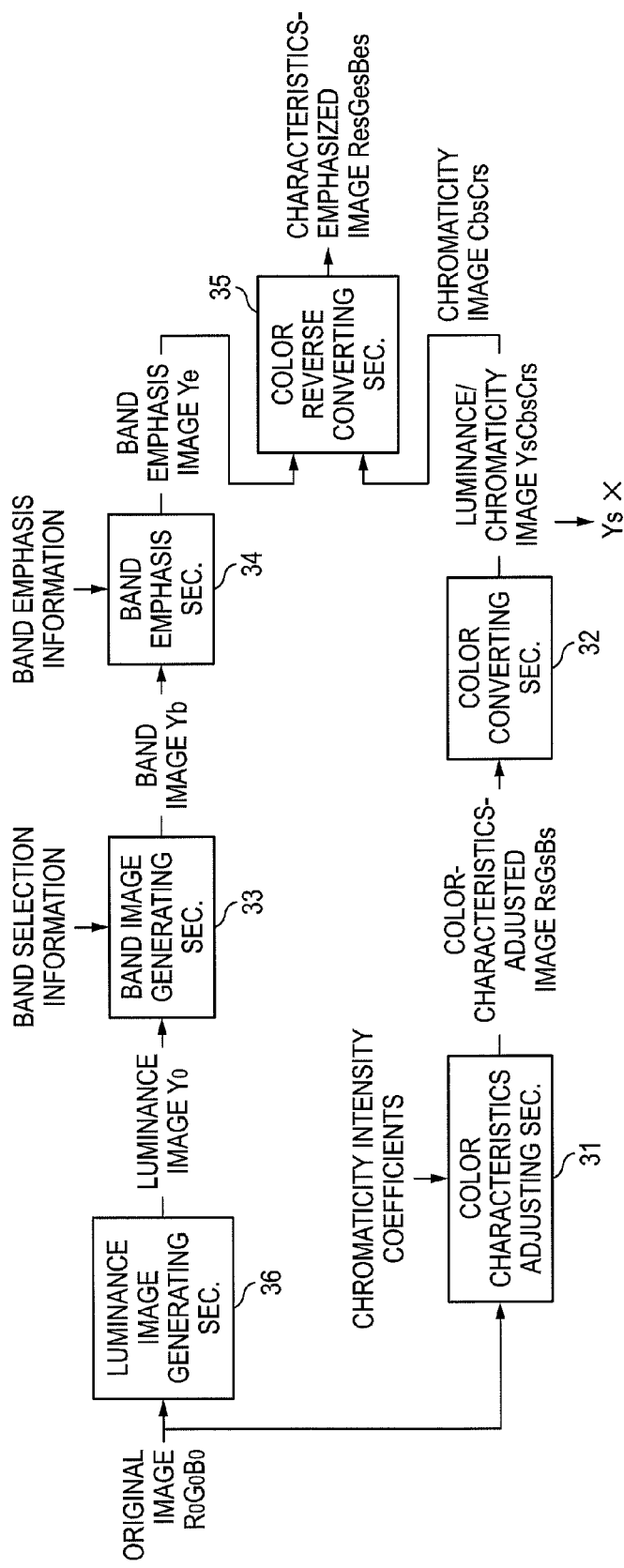
FIG. 16 shows the configuration of an image adjusting apparatus which is a modification of the image adjusting apparatus according to the third exemplary embodiment of the invention.

FIG. 16 shows the configuration of an image adjusting apparatus which is a modification of the image adjusting apparatus according to the third exemplary embodiment of the invention. Whereas in image adjusting apparatus of FIG. 15 the band emphasis is performed after the color characteristics adjustment, in this modification band emphasis processing is performed on a given original color image independently of color characteristics adjustment. Differences from the image adjusting apparatus of FIG. 15 will mainly be described below.

A luminance image generating section 36 generates a luminance image from a given original color image by converting the original image signals into luminance/chromaticity signals and extracting a luminance signal from them. In this example, since the YCbCr color space is employed as the luminance/chromaticity color space, a luminance signal is obtained by converting the original image signals in the RGB color space into signals in the YCbCr color space and extracting a luminance signal from them. A luminance image is obtained using an L* component in the case of the CIELAB color space and a V component in the case of the HSV color space.

The band image generating section 33 generates a band image in a preset band on the basis of the luminance image generated by the luminance image generating section 36. And band emphasis processing is performed on the luminance image generated from the given original image. The other part of the processing performed by the band image generating section 33 and the pieces of processing performed by the other sections are the same as in the image adjusting apparatus of FIG. 15 according to the third exemplary embodiment.

In the image processing apparatus according to the first or second exemplary embodiment, band selection information and band emphasis information are obtained in such a manner that the luminance image generating section 11 generates a luminance component image and the band decomposition section 12 decomposes it into band images. Where the sections 11 and 12 are used, the luminance image generating section 36 may be omitted and the band image generating section 33 may be configured so as to select a band image of the band that is indicated by band selection information from band images generated by the band decomposition section 12.

In the image adjusting apparatus according to the third exemplary embodiment and the image adjusting apparatus as its modification, a color adjustment is performed on an original color image. Where no color adjustment is performed, the color characteristics adjusting section 31 may be omitted. In the case of an original monochrome image, the image adjusting apparatus may be composed of only the band image generating section 33 and the band emphasis section 34.

Figure 17:
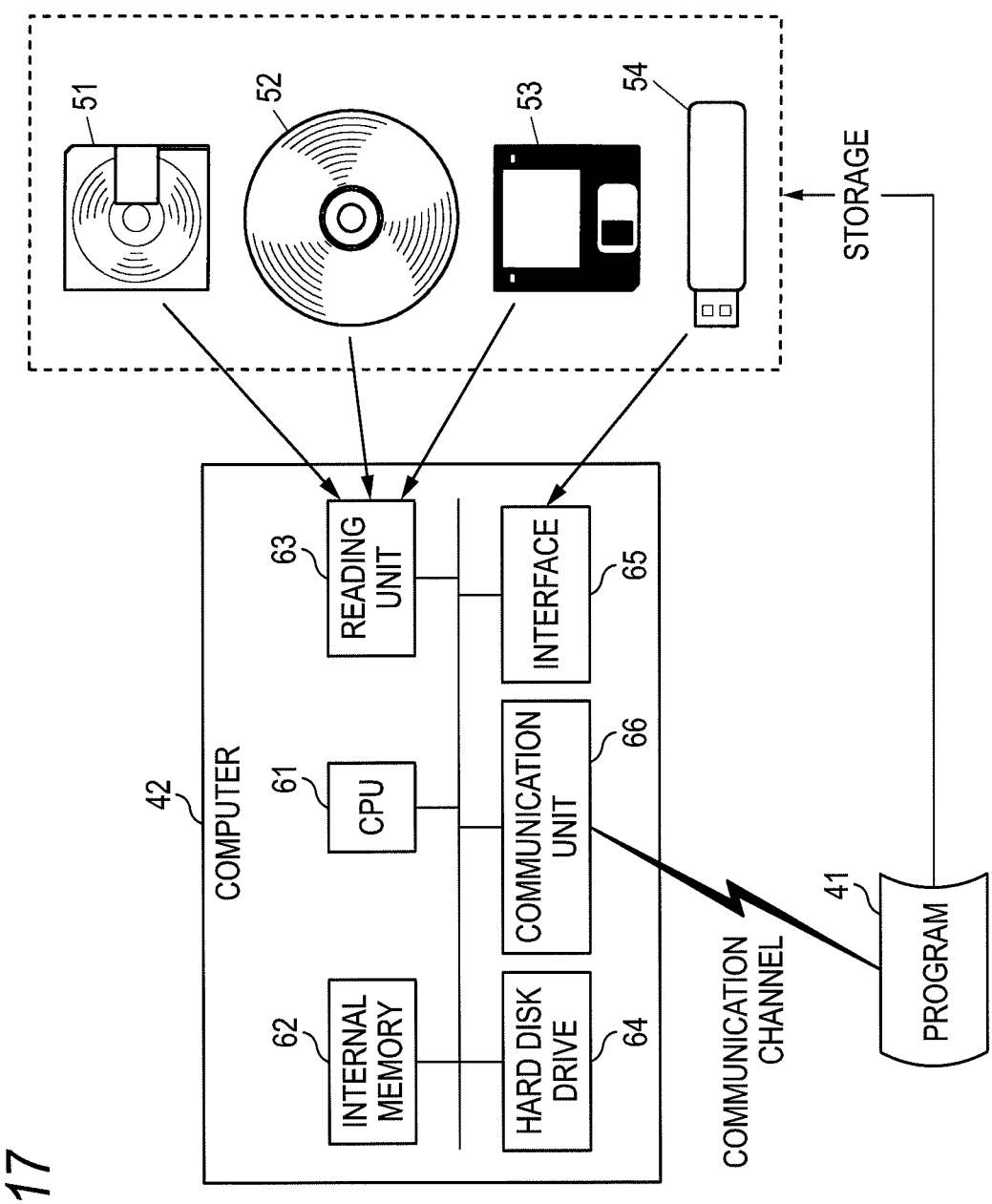
FIG. 17 shows an example computer program, an example storage medium which is stored with the computer program, and an example computer in the case where the functions of the image processing apparatus according to the first or second exemplary embodiment and/or the functions of the image adjusting apparatus according to the third exemplary embodiment or the image adjusting apparatus as its modification are implemented by the computer program.

FIG. 17 shows an example computer program, an example storage medium which is stored with the computer program, and an example computer in the case where the functions of the image processing apparatus according to the first or second exemplary embodiment and/or the functions of the image adjusting apparatus according to the third exemplary embodiment or the image adjusting apparatus as its modification are implemented by the computer program. In FIG. 17, reference numeral 41 denotes a program; 42, a computer; 51, a magneto-optical disc; 52, an optical disc; 53, a magnetic disk; 54, a memory; 61, a CPU; 62, an internal memory; 63, a reading unit; 64, a hard disk drive; 65, an interface; and 66, a communication unit.

All or part of the functions of the image processing apparatus according to the first or second exemplary embodiment and/or all or part of the functions of the image adjusting apparatus according to the third exemplary embodiment or the image adjusting apparatus as its modification may be implemented by the program 41 which is run by the computer 42. In this case, the program 41 and data etc. to be used by the program 41 are stored in a storage medium which is read by the computer 42. The term "storage medium" means a medium which causes magnetic, optical, electrical, or like variations according to the contents of the program 41 in either of the reading unit 63 and the interface 65 which are part of the hardware resources of the computer 42, whereby the contents of the program 41 are transferred to the reading unit 63 or the interface 65 in the form of a corresponding signal. The magneto-optical disc 51, the optical disc 52 (e.g., CD or DVD), the magnetic disk 53, the memory 54 (e.g., IC card, memory card, or flash memory) are examples of the storage medium. The storage medium is not limited to a portable one.

The program 41 is stored in the storage medium and inserted into, for example, the reading unit 63 or the interface 65. The program 41 is read from the storage medium and stored in the internal memory 62 or the hard disk drive 64 (incorporates a magnetic disk, a silicon disk, or the like). Then, the program 41 run by the CPU 61, whereby all or part of the functions of the image processing apparatus according to the first or second exemplary embodiment and/or all or part of the functions of the image adjusting apparatus according to the third exemplary embodiment or the image adjusting apparatus as its modification are realized. Alternatively, the program 41 is transferred to the computer 42 over a communication channel. In the computer 42, the program 41 is received by the communication unit 66, stored in the internal memory 62 or the hard disk drive 64, and run by the CPU 61.

Any of various other devices may be connected to the computer 42 through the interface 65. For example, a display unit for displaying information maybe connected to the computer 42 and display an original image and a characteristics-emphasized image. A receiving unit for receiving information from a user may be connected to the computer 42 to enable selection of band reference values. Naturally, any of other devices may be connected to the computer 42. The program 41 need not always run on a single computer, and its processing steps may be executed by different computers. For example, the functions of the image processing apparatus according to the first or second exemplary embodiment and the functions of the image adjusting apparatus according to the third exemplary embodiment or the image adjusting apparatus as its modification may be performed by either a single computer or separate computers. The functions of the image processing apparatus according to the first or second exemplary embodiment or the functions of the image adjusting apparatus according to the third exemplary embodiment or the image adjusting apparatus as its modification may be performed by plural computers.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus comprising:
   a decomposing section that decomposes a luminance component of a given original image into a plurality of band images in respective bands;
   a band intensity calculating section that calculates band intensities of the respective band images; and
   a determining section that determines band selection information indicating an emphasis band and band emphasis information to be used for controlling a degree of image emphasis based on the band intensities of the respective bands;
   wherein the determining section determines band selection information based on differences between the band intensities of the respective bands and set band reference values and determines band emphasis information according to a difference between the band intensity and the band reference value of the band indicated by the band selection information.

2. The image processing apparatus according to claim 1, wherein the decomposing section sets a plurality of bands that range from a low-frequency band to a high-frequency band and include at least one low-frequency-side band not including zero frequency.

3. The image processing apparatus according to claim 1, wherein the band intensity calculating section calculates a band intensity of each of the band images based on an integration value of pixel values thereof.

4. The image processing apparatus according to claim 1, wherein the determining section determines band selection information and band emphasis information based on differences between the band intensities of the respective bands and set band reference values.

5. The image processing apparatus according to claim 1, further comprising:
   a band region image generating section that generates a band region image indicating large-pixel-value regions in each of the band images; and
   an area parameter calculating section that calculates an area parameter representing the total area of the large-pixel-value regions based on the band region image of each of the band images,
   wherein the band intensity calculating section calculates a band intensity of each of the band images using the band image and band region image thereof; and
   the determining section determines band selection information and band emphasis information based on the calculated band intensities and area parameters.

6. The image processing apparatus according to claim 5, wherein the band region image generating section generates a band region image of each of the band images by binarizing the band image.

7. The image processing apparatus according to claim 5, wherein the determining section determines band selection information and band emphasis information based on one or both of differences between the band intensities of the respective bands and set band reference values and the area parameters of the respective bands.

8. The image processing apparatus according to claim 5, wherein the determining section determines band selection information based on one or both of differences between the band intensities of the respective bands and set band reference values and the area parameters of the respective bands, and determines band emphasis information according to a difference between the band intensity and the band reference value of the band indicated by the band selection information.

9. An image adjusting apparatus comprising:
an adjusting section that adjusts color characteristic of a given original image; a converting section that converts the color-characteristic-adjusted original image into a luminance/chromaticity image;
a band image generating section that generates a band image of the band indicated by the band selection information determined by the image processing apparatus according to claim 1 based on a luminance image of the luminance/chromaticity image; and
an emphasizing section that produces a band-emphasized image according to the band emphasis information determined by the image processing apparatus according to claim 1 using the luminance image and the band image.

10. An image adjusting apparatus comprising:
a luminance image generating section that generates a luminance image from a given original image;
a band image generating section that generates a band image of the band indicated by the band selection information determined by the image processing apparatus according to claim 1 based on the luminance image; and
an emphasizing section that produces a band-emphasized image according to the band emphasis information determined by the image processing apparatus according to claim 1 using the luminance image and the band image;
an adjusting section that adjusts color characteristic of the given original image; and
a converting section that converts the color-characteristic-adjusted original image into a luminance/chromaticity image.

11. An image processing method comprising:
decomposing a luminance component of a given original image into a plurality of band images in respective bands;
calculating band intensities of the respective band images; and determining band selection information indicating an emphasis band and band emphasis information to be used for controlling a degree of image emphasis based on the band intensities of the respective bands;
determining band selection information based on differences between the band intensities of the respective bands and set band reference values; and
determining band emphasis information according to a difference between the band intensity and the band reference value of the band indicated by the band selection information.

12. A non-transitory computer readable medium storing a program causing a computer to execute a process for image processing, the process comprising:
decomposing a luminance component of a given original image into a plurality of band images in respective bands;
calculating band intensities of the respective band images; and
determining band selection information indicating an emphasis band and band emphasis information to be used for controlling a degree of image emphasis based on the band intensities of the respective bands;
determining band selection information based on differences between the band intensities of the respective bands and set band reference values; and
determining band emphasis information according to a difference between the band intensity and the band reference value of the band indicated by the band selection information.

* * * * *